(12) United States Patent
Stamps

(10) Patent No.: US 9,593,267 B2
(45) Date of Patent: Mar. 14, 2017

(54) ADHESIVE COMPOSITIONS AND METHODS OF USING THE SAME

(71) Applicant: SHELL OIL COMPANY, Houston, TX (US)

(72) Inventor: Ricky Loy Stamps, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 21 days.

(21) Appl. No.: 14/366,286

(22) PCT Filed: Dec. 17, 2012

(86) PCT No.: PCT/US2012/070083
§ 371 (c)(1),
(2) Date: Jun. 18, 2014

(87) PCT Pub. No.: WO2013/096193
PCT Pub. Date: Jun. 27, 2013

(65) Prior Publication Data
US 2015/0059975 A1    Mar. 5, 2015

Related U.S. Application Data

(60) Provisional application No. 61/577,694, filed on Dec. 20, 2011.

(51) Int. Cl.
| | | |
|---|---|---|
| C08L 91/00 | (2006.01) | |
| C09J 131/04 | (2006.01) | |
| C09J 123/08 | (2006.01) | |
| C08L 23/08 | (2006.01) | |
| C08L 93/00 | (2006.01) | |
| C08L 65/00 | (2006.01) | |
| B32B 37/12 | (2006.01) | |
| C09J 5/00 | (2006.01) | |
| C09J 11/08 | (2006.01) | |
| C08L 57/02 | (2006.01) | |

(52) U.S. Cl.
CPC ......... *C09J 131/04* (2013.01); *B32B 37/1207* (2013.01); *B32B 37/1284* (2013.01); *C08L 23/0853* (2013.01); *C08L 65/00* (2013.01); *C08L 91/00* (2013.01); *C08L 93/00* (2013.01); *C09J 5/00* (2013.01); *C09J 11/08* (2013.01); *C09J 123/0853* (2013.01); *B32B 2037/1215* (2013.01); *C08L 57/02* (2013.01); *C09J 2201/61* (2013.01)

(58) Field of Classification Search
CPC ...... C08L 91/00; C08L 93/00; C08L 23/0853; C09J 123/0853; C09J 131/04
See application file for complete search history.

(56) References Cited

U.S. PATENT DOCUMENTS

| | | | |
|---|---|---|---|
| 5,232,290 A | 8/1993 | Buschle et al. | |
| 2010/0047499 A1* | 2/2010 | Braksmayer | C09J 11/08 428/40.5 |
| 2011/0190182 A1* | 8/2011 | Price | C08F 8/14 508/507 |

FOREIGN PATENT DOCUMENTS

| | | |
|---|---|---|
| CN | 101818035 | 9/2010 |
| EP | 668342 | 8/1995 |
| EP | 776959 | 6/1997 |
| FR | 2765232 | 12/1998 |
| KR | 20110035404 | 4/2011 |
| WO | 9721788 | 6/1997 |
| WO | 9920720 | 4/1999 |
| WO | 9941332 | 8/1999 |
| WO | 0008115 | 2/2000 |
| WO | 0014179 | 3/2000 |
| WO | 0014183 | 3/2000 |
| WO | 0014187 | 3/2000 |
| WO | 0014188 | 3/2000 |
| WO | 0015736 | 3/2000 |
| WO | 0118156 | 3/2001 |
| WO | 0157166 | 8/2001 |
| WO | 2008008420 | 1/2008 |

OTHER PUBLICATIONS

Machine translation of CN 1010818035, Ren, Sep. 2010.*
DuPont Elvax 360; "Dupont Packaging & Industrial Polymers"; Elvax resins Product Data Sheet; 3 Pages; Feb. 16, 2011; http://elvax.dupont.com.
DuPont Elvax 260; "Dupont Packaging & Industrial Polymers"; Elvax resins Product Data Sheet; 3 Pages; Feb. 16, 2011; http://elvax.dupont.com.
DuPont Elvax 150W; "Dupont Packaging & Industrial Polymers"; Elvax resins Product Data Sheet; 3 Pages; Feb. 16, 2011; http://elvax.dupont.com.
Arizona Chemical; Material Safety Data Sheet; Product—SYLVARES TP 7042; 5 pages; Mar. 5, 2001.

* cited by examiner

*Primary Examiner* — Philip Tucker
*Assistant Examiner* — Jimmy R Smith, Jr.

(57) ABSTRACT

A composition comprising a base oil in an amount from 5 to 95 wt %, an ethylene vinyl acetate copolymer resin, and an ester-soluble tackifying resin; wherein the ethylene vinyl acetate copolymer resin is present in an amount from 5 to 95 wt % based on the total weight of the ethylene vinyl acetate copolymer resin and the ester-soluble tackifying resin is provided. Methods for assembling or lubricating turbine engines are also provided.

7 Claims, No Drawings

ADHESIVE COMPOSITIONS AND METHODS OF USING THE SAME

PRIORITY CLAIM

The present application is the National Stage (§371) of International Application No. PCT/US2012/070083, filed Dec. 17, 2012, which claims priority from U.S. Provisional Application No. 61/577,694 filed Dec. 20, 2011, the disclosures of which are incorporated herein by reference.

CROSS-REFERENCE TO RELATED APPLICATIONS

This application claims the benefit of U.S. Provisional Application No. 61/577,694, filed on 20 Dec. 2011, which is incorporated herein by reference.

BACKGROUND

Certain turbine engine manufacturers assemble large cylindrical roller bearings on bearing shafts. Either the bearing race or the shaft may be heated during assembly. If the cylindrical rolling elements, referred to as rollers herein, of the bearing are not supported within their cages with the parts perfectly mated, then scoring damage to the rollers and/or the shaft may occur during the assembly process. Such damage may lead to early engine failure. After the engine is assembled, it is charged with turbine engine oil and run at an elevated temperature during a test called a green run. After the green run, the engine oil is drained and the turbine engine is recharged with turbine engine oil in preparation for normal service. During the green run and normal service, the engine oil is circulated through a filter. It is necessary that the engine filter not be clogged by materials in the engine oil, which might lead to lubricant starvation.

To solve the scoring problem, some manufacturers use a petrolatum or petrolatum-like products as an assembly aid on the rollers. However, the relatively low melting point of these products limits their ability to hold parts, i.e., as an assembly aid, during assembly at elevated temperatures. Under normal operating conditions, such assembly aids typically take less than one minute to fail, i.e. to melt sufficiently so that they release from the parts using the drop test described herein. Moreover, petrolatums are insoluble in polar fluids, such as esters.

Petrolatum or petrolatum-like products are currently used because they melt at the engine operating temperature and can be drained, while molten, along with the turbine engine oil. However, it would be preferable to have an assembly aid that is soluble in engine lubricants and which also has holding strength at the elevated temperatures at which certain engine manufacturers, such as aviation turbine engine manufacturers, assemble the engines.

Other uses for compositions having such characteristics also exist. For example, remaining solid at elevated temperatures, yet possessing the tackiness or stickiness needed in an assembly aid, is also useful in hot melt adhesives used in a variety of applications.

SUMMARY

The instant invention relates to adhesive compositions and methods of using such compositions.

In one embodiment, the instant invention provides a composition comprising: a base oil in an amount from 5 to 95 weight percent (wt %); an ethylene vinyl acetate copolymer resin; and an ester-soluble tackifying resin; wherein the ethylene vinyl acetate copolymer resin is present in an amount from 5 to 95 wt % based on the total weight of the ethylene vinyl acetate copolymer resin and the ester-soluble tackifying resin.

In another embodiment, the instant invention further provides a method for assembling or lubricating turbine engines comprising: applying a composition between two or more engine components, wherein the composition comprises a base oil in an amount from 5 to 95 wt %; an ethylene vinyl acetate copolymer resin; and an ester-soluble tackifying resin; wherein the ethylene vinyl acetate copolymer resin is present in an amount from 5 to 95 wt % based on the total weight of the ethylene vinyl acetate copolymer resin and the ester-soluble tackifying resin.

In another embodiment, the instant invention provides a compound consisting essentially of a base oil in an amount from 5 to 95 wt %; an ethylene vinyl acetate copolymer resin; and an ester-soluble tackifying resin; wherein the ethylene vinyl acetate copolymer resin is present in an amount from 5 to 95 wt % based on the total weight of the ethylene vinyl acetate copolymer resin and the ester-soluble tackifying resin.

DETAILED DESCRIPTION

The instant invention generally relates to adhesive compositions and methods of using the same. As used herein, the term "adhesive composition" is intended to encompass compositions having at least the components described herein. Accordingly, the use of the modifier "adhesive" is not intended to limit the use of such compositions, but rather as indicative that the compositions have certain characteristics that may make them particularly useful in certain applications, such as hot melt adhesives or assembly aids.

In one embodiment, a composition of the present invention comprises a base oil of from 5 to 95 wt %, an ethylene vinyl acetate copolymer (EVA) resin, and an ester-soluble tackifying resin, wherein the EVA resin is present in an amount from 5 to 95 wt % based on the total weight of the EVA resin and the ester-soluble tackifying resin.

Base oils suitable for use in the present invention may include oils selected from the group consisting of natural base oils, synthetic base oils, and combinations thereof.

Typically, base oils are a base stock or a blend of base stocks which is a lubricant component that is produced by a single manufacturer to the same specifications (independent of feed source or manufacturer's location); that meets the same manufacturer's specification; and that is identified by a unique formula, product identification number, or both. Base stocks may be manufactured using a variety of different processes including but not limited to distillation, solvent refining, hydrogen processing, oligomerization, esterification, and rerefining.

Examples of natural base oils may include animal oils, vegetable oils (e.g., rapeseed oils, castor oils), petroleum oils, mineral oils, and oils derived from coal or shale. Examples of mineral oils may include liquid petroleum oils and solvent-treated or acid-treated mineral lubricating oil of the paraffinic, naphthenic, or mixed paraffinic/naphthenic type which may be further refined by hydrofinishing processes and/or dewaxing.

Examples of synthetic base oils may include hydrocarbon oils such as olefin oligomers, polyalphaolefins (PAOs), dibasic acid esters, polyol esters, and dewaxed waxy raffinate. Hydrocarbon synthetic oils useful in the invention may include, for example, oils prepared from the polymerization of ethylene, i.e., PAO, or from hydrocarbon synthesis procedures using carbon monoxide and hydrogen gases such as in a Fisher-Tropsch process. Fischer-Tropsch derived base oils useful in the invention, may include, for example, the Fischer-Tropsch derived base oils disclosed in EP-A-776959, EP-A-668342, WO-97/21788, WO-00/15736, WO-00/14188, WO-00/14187, WO-00/14183, WO-00/14179, WO-00/08115, WO-99/41332, EP-1029029, WO-01/18156 and WO-01/57166.

Synthetic base oils may include hydrocarbon oils and halo-substituted hydrocarbon oils such as polymerized and inter-polymerized olefins, alkylated naphthalenes, polyol ester oils, alkylbenzenes, polyphenyls, alkylated diphenyl ethers, alkylated diphenyl sulfides, as well as their derivatives, analogues and homologues thereof, and the like. Synthetic lubricating oils also include alkylene oxide polymers, interpolymers, copolymers and derivatives thereof wherein the terminal hydroxyl groups have been modified by, for example, esterification and/or etherification. Another suitable class of synthetic lubricating oils comprises the esters of dicarboxylic acids with a variety of alcohols. Esters useful as synthetic oils also include those made from C5 to C12 monocarboxylic acids and polyols and polyol ethers. Tri-alkyl phosphate ester oils are also suitable for use as base oils.

Suitable base oils include those in all API categories I, II, III, IV and V as defined in API Publication 1509, 14th Edition, Addendum I, December 1998, which is herein incorporated for all purposes.

Base oil derived from the hydroisomerization of wax may also be used, either alone or in combination with the aforesaid natural and/or synthetic base oil. Such wax isomerate oil is produced by the hydroisomerization of natural or synthetic waxes or mixtures thereof over a hydroisomerization catalyst.

In particular embodiments, the base oil is selected from the group consisting of an alkylated naphthalene-based oil, a polyol ester oil, an olefin ester copolymer based oil, a polyalphaolefinic oil, and any combination thereof.

The base oil may be present in the compositions of the present invention in an amount from 5 to 95 weight percent (wt %). All ranges and subranges from 5 to 95 wt % are included and disclosed herein. For example, the amount of the base oil may be from a lower limit of 5, 15, 25, 35, 45, 55, 65, 75, 85, or 90 wt % to an upper limit of 10, 20, 30, 40, 50, 60, 70 80, 90, or 95 wt %. In exemplary embodiments, the base oil may be present in the compositions of the present invention in the range from 5 to 95 wt %, or in the alternative, from 20 to 60 wt %, or in the alternative, from 30 to 90 wt %.

EVA resins suitable for use in the compositions of the present invention include any EVA resin. Preferably, the EVA resin is soluble in the base oil and in the oil used in a particular end use. In some embodiments, the EVA resin is substantially soluble in alkylated naphthalene-based oils, polyol ester oils, olefin ester copolymer based oils, and/or polyalphaolefinic oils. Substantially soluble as used herein does not mean completely miscible, but rather indicates that when 2 wt % of the composition comprising the EVA resin is mixed into an oil used in a particular end use with stirring at 180° C. to form a solution or mixture, followed by cooling undisturbed at room temperature, the solution or mixture will remain as one phase greater than 8 hours and with no precipitate for greater than 24 hours. As used herein, the term "precipitate" means a solid formed from a solution or suspension by a chemical or physical change.

In some embodiments, EVA resins suitable for use in the compositions of the present invention are soluble such that when 2 g of the composition comprising the EVA resin is mixed into 98 g of an oil used in a particular end use with stirring at 180° C. to form a mixture, no more than 40 mg/l residue is collected on a 5 μm pore size, 47 mm diameter membrane filter when the mixture is filtered at 150° C.

Generally, EVA resins suitable for use in the compositions of the present invention contain from 5 to 50 percent by weight of units derived from vinyl acetate and from 50 to 95 percent by weight of units derived from ethylene. All individual values and subranges from 5 to 50 weight percent are included herein and disclosed herein; for example, the amount of units derived from vinyl acetate can be from a lower limit of 5, 15, 25, 35, or 45 wt % to an upper limit of 15, 25, 35, 45, or 50 wt %. For example, the amount of units derived from vinyl acetate in the EVA resins may be in the range of from 5 to 50 wt %, or in the alternative, the amount of units derived from vinyl acetate in the EVA resins may be in the range of from 25 to 32 wt %, or in the alternative, the amount of units derived from vinyl acetate in the EVA resins may be in the range of from 20 to 40 wt %. All individual values and subranges from 50 to 95 wt % are included herein and disclosed herein; for example, the amount of units derived from ethylene can be from a lower limit of 50, 60, 70, 80, or 90 wt % to an upper limit of 60, 70, 80, 90, or 95 wt %. For example, the amount of units derived from ethylene in the EVA resins may be in the range of from 50 to 95 wt %, or in the alternative, the amount of units derived from ethylene in the EVA resins may be in the range of from 68 to 75 wt %, or in the alternative, the amount of units derived from vinyl acetate in the EVA resins may be in the range of from 60 to 80 wt %.

Exemplary ethylene vinyl acetate copolymer resins include those available under the tradename ELVAX™ from the Dupont Company (Wilmington, Del., USA).

The EVA resin may be present in the compositions of the present invention in an amount from 5 to 95 wt % based on the total weight of the EVA resin and the ester-soluble tackifying resin. All ranges and subranges from 5 to 95 wt % are included and disclosed herein. For example, the amount of EVA resin may be from a lower limit of 5, 15, 25, 35, 45, 55, 65, 75, 85, or 90 wt % to an upper limit of 10, 20, 30, 40, 50, 60, 70 80, 90, or 95 wt %. In exemplary embodiments, the EVA resin may be in the range from 5 to 95 wt %, or in the alternative, from 15 to 50 wt %, or in the alternative, from 20 to 50 wt %, or in the alternative, from 25 to 45 wt %, in each instance, based upon the total weight of the EVA resin and the ester-soluble tackifying resin.

Ester-soluble tackifying resins suitable for use in the compositions of the present invention include any ester-soluble tackifying resin. As used herein the term "ester-soluble" means that an effective amount of the tackifying resin is soluble in an ester. The term "ester-soluble" herein does not mean that the tackifying resin is completely miscible in all esters in all ratios of tackifying resin to ester.

Examples of suitable ester-soluble tackifying resins include the rosins, their disproportionated, hydrogenated, polymerized and esterified derivatives and salts, aliphatic, cycloaliphatic, aromatic, aliphatic-aromatic, aromatic modified alicyclic, and alicyclic hydrocarbon resins and modified versions and hydrogenated derivatives thereof; terpenes (polyterpenes), modified terpenes (e.g., phenolic modified terpene resins), and mixtures thereof. Any desired combinations of these and other resins can be used in order to adjust the properties of the resultant adhesive composition in accordance with what is desired.

In certain embodiments, the ester-soluble tackifying resin is a terpene phenolic resin. Preferably, the terpene phenolic resin is substantially soluble in the base oil. In some embodiments, the terpene phenolic resin is chosen so as to be soluble in alkylated naphthalene-based oils, polyol ester oils, olefin ester copolymer based oils, and/or polyalphaolefinic oils. Exemplary terpene phenolic resins and modified rosins include those available under the tradenames SYLVARES™ and SYLVATAC™ from the Arizona Chemical Company (Jacksonville, Fla., USA) or TAMANOL™ from Arakawa Chemical (USA) Inc. (Chicago, Ill., USA).

In certain embodiments, compositions of the present invention exhibit a tackiness or adhesive ability such that two parts may be held together by the composition against the force of gravity at an elevated temperature. Specifically, a 10 to 14 mm diameter roller to which a composition of the present invention is applied requires a time to completely separate or drop from a cage or retainer segment at 121° C. of equal to or greater than 4 minutes. All individual values and subranges from equal to or greater than 4 minutes are included herein and disclosed herein; for example, the time to drop at 121° C. using a 10 to 14 mm roller can be from a lower limit of 4, 4.5, 5, 5.5, 6 or 6.5 minutes.

In certain embodiments, compositions of the present invention are soluble in one or more SAE AS5780 qualified oils, e.g., oils that meet the basic performance requirements for 5 cSt grade aircraft gas turbine engine lubricants set forth in the AS570 standard by SAE International, such that when 2 wt % of the composition is mixed into the qualified oil with stirring at 180° C. to form a solution or mixture, followed by cooling undisturbed at room temperature, the solution or mixture will remain as one phase greater than 8 hours and with no precipitate for greater than 24 hours.

Some embodiments of the compound are soluble in one or more SAE AS5780 qualified oils such that when 2 g of the inventive compound is mixed into 98 g of the qualified oil with stirring at 180° C. to form a mixture, no more than 40 mg/l residue is collected on a 5 µm pore size, 47 mm diameter membrane filter when the mixture is filtered at 150° C.

The compositions of the present invention may be used for one or more end use applications, including for example, assembly aid applications, and hot melt adhesive applications. In one particular embodiment, a composition of the present invention may be used as an aviation engine assembly aid. In an alternative embodiment, a composition of the present invention may be used as a hot melt adhesive.

In some specific embodiments of the invention, a composition of the present invention may further comprise one or more additives selected from the group consisting of antioxidants, friction modifiers, corrosion inhibitors, and anti-wear agents, as are well known in the art.

EXAMPLES

The following examples illustrate the present invention but are not intended to limit the scope of the invention.

Five Inventive Examples (Inv. Ex. 1-5) were prepared by blending the components in the mass ratios as shown in Table 1.

Table 2 shows the result of roller drop testing as described herein and visual appearance testing as indicated. As can be seen from Table 2, each of the Inventive Examples exhibited a greater than 4 minute time to drop on roller drop testing using a 10 mm roller or 14 mm roller. Further, each of the Inventive Examples exhibited no phase separation 24 hours after blending and Inventive Examples 3-5 showed no separation 96 hours after blending.

TABLE 1

| Component Type/Mass Ratios | Component/ Blend | Inv. Ex. 1 | Inv. Ex. 2 | Inv. Ex. 3 | Inv. Ex. 4 | Inv. Ex. 5 |
| --- | --- | --- | --- | --- | --- | --- |
| Base Oil | SYNESSTIC 12* | 20 wt % | 20 wt % | 20 wt % | 25 wt % | 25 wt % |
| Tackifying Resin | SYLVARES TP 7042** | 40 wt % | 40 wt % | 50 wt % | 50 wt % | 45 wt % |
| EVA - | ELVAX 150*** | — | — | — | — | — |
| EVA - | ELVAX 260*** | 40 wt % | — | 30 wt % | 25 wt % | 30 wt % |
| EVA - | ELVAX 360*** | — | 40 wt % | — | — | — |

*Available from Exxon Mobil Chemicals, a division of Exxon Mobil Corporation.
**Available from Arizona Chemical Company (Jacksonville, FL, USA).
***Available from the Dupont Company.

TABLE 2

| Test Method | Test Measurement/ Condition | Inv. Ex. 1 | Inv. Ex. 2 | Inv. Ex. 3 | Inv. Ex. 4 | Inv. Ex. 5 |
| --- | --- | --- | --- | --- | --- | --- |
| Visual Inspection | Appearance | clear light amber | clear light amber | clear light amber | clear light amber | clear light amber |
| Visual Inspection | Texture | slightly tacky & pliable | slightly tacky & pliable | slightly tacky & pliable | slightly tacky & pliable | slightly tacky & pliable |
| Roller Drop 121° C., 10 mm | Time to Drop (min:sec) | 6:59 | 6:09 | 6:38 | 8:29 | 8:12 |
| | Assembly Aid Weight, g | 0.2 | 0.2 | 0.2 | 0.5 | 0.2 |
| Roller Drop 121° C., 14 mm | Time to Drop (min:sec) | 6:46 | 4:31 | 5:07 | 7:17 | 6:38 |
| | Assembly Aid Weight, g | 0.3 | 0.4 | 0.5 | 1.6 | 0.8 |

TABLE 2-continued

| Test Method | Test Measurement/ Condition | Inv. Ex. 1 | Inv. Ex. 2 | Inv. Ex. 3 | Inv. Ex. 4 | Inv. Ex. 5 |
|---|---|---|---|---|---|---|
| Solubility Visual Inspection | Appearance Separation after 24 hours | Hazy None | Hazy None | Hazy None | Hazy None | Hazy None |
| Visual Inspection | Separation after 96 hours at room temperature | 2 layers | 2 layers | None | None | None |

Test Methods

Hot Adhesion/Roller Drop

Roller adhesion tests have been proposed as a performance requirement of the draft SAE AMS-M Assembly Aid Specification (2009). The test is based on a single row cylindrical roller bearing similar to an NU 208 or 212 ECM series.

The test apparatus consists of a roller cage segment cut from the cylindrical roller bearing which includes one roller and the square/rectangular pocket which is of approximately wall thickness. The sides of the pocket are parallel to the roller ends and provide one mm clearance on each side of the roller. The front and back walls are filed down to provide a flat wall with a one mm clearance to the diameter of the roller.

The roller cage segment is oriented arching down and elevated above the work area such that there is greater than one roller diameter clearance above the work surface and below the cage segment to allow for a complete drop of the tested roller away from the cage segment. The roller is centered vertically in the pocket via a spacer under the roller. The roller may be raised or removed from the pocket as adhesive composition is applied to the inside of the roller pocket and roller surface in order to hold the roller in place. Additional adhesive composition may be used as desired up to a total 1.0 g.

The apparatus based on an NU 208-ECM or NU 212 ECM or similar 10 to 14 mm diameter cylindrical roller bearing was placed in an oven/air-furnace that had been preheated to 121° C. The temperature of the oven and the time between the moment the furnace door was closed and when the roller dropped completely out of the cage to the work surface was measured. Temperature in ° C. and time in minutes and seconds were reported.

Table 3 provides roller and cage measurements for each of the described roller drop tests.

TABLE 3

|  | Units | NU 208 ECM | NU 212 ECM |
|---|---|---|---|
| Roller Width | mm | 10 | 14 |
| Roller Diameter | mm | 10 | 14 |
| Bearing Diameter | mm | 80 | 110 |
| Bore Diameter | mm | 40 | 60 |
| Bearing Width | mm | 18 | 22 |
| Cage Pocket width | mm | 10.3 | 14.2 |
| Cage Pocket length | mm | 10.4 | 14.4 |
| Cage thickness | mm | 5.6 | 8.1 |
| Roller Mass | g | 6.0 | 16.5 |

Solubility/Visual Inspection

Two grams of the compound was mixed in 98 g of one or more SAE AS5780 qualified oils with stirring at 180° C. for 2 hours until a uniform mixture was achieved. Heating and stirring of the mixture was then discontinued and the mixture is allowed to sit undisturbed and cool to room temperature (about 25° C.). The mixture was visually inspected for phase separation and clarity after standing undisturbed for 8, 24, and 96 hours.

Solubility/Filtration

Solubility was determined by mixing 2 g of the compound in 98 g of one or more SAE AS5780 qualified oils with stirring at 180° C. to form a mixture followed by filtration above 150° C. through a 47 mm diameter 5 micron membrane filter.

The present invention may be embodied in other forms without departing from the spirit and the essential attributes thereof, and, accordingly, reference should be made to the appended claims, rather than to the foregoing specification, as indicating the scope of the invention.

That which is claimed is:

1. A method for assembling or lubricating a turbine engine comprising:
applying a composition between two or more turbine engine components, wherein the composition comprises:
a base oil in an amount from 5 to 95 wt % based on the total weight of the composition;
an ethylene vinyl acetate copolymer resin; and
an ester-soluble tackifying resin;
wherein the ethylene vinyl acetate copolymer resin is present in an amount from 5 to 95 wt % based on the total weight of the ethylene vinyl acetate copolymer resin and the ester-soluble tackifying resin.

2. The method according to claim 1, wherein the base oil comprises an alkylated naphthalene-based oil.

3. The method according to claim 1, wherein the base oil comprises a polyol ester oil.

4. The method according to claim 1, wherein the base oil comprises an olefin ester copolymer based oil.

5. The method according to claim 1, wherein the base oil comprises a polyalphaolefinic oil.

6. The method according to claim 1, wherein the ester-soluble tackifying resin is a terpene phenolic resin.

7. The method according to claim 1, wherein the composition is soluble in a SAE AS5780 qualified oil such that when 2 wt % of the composition is mixed into the SAE AS5780 qualified oil with stirring at 180° C. to form a mixture, followed by cooling at room temperature, the mixture will remain as one phase greater than 8 hours and with no precipitate for greater than 24 hours.

* * * * *